United States Patent Office 3,179,484
Patented Apr. 20, 1965

3,179,484
METHOD FOR IMPROVING THE DYE-RECEPTIVITY AND DYEABILITY OF POLYPROPYLENE
Marco Tessandori, Milan, and Argento Crotti, Cogliate, Milan, Italy, assignors to Aziende Colori Nazionali Affini ACNA S.p.A., Milan, Italy, a corporation of Italy
No Drawing. Filed Aug. 1, 1960, Ser. No. 46,335
Claims priority, application Italy, Aug. 3, 1959, 13,048/59
8 Claims. (Cl. 8—55)

The present invention relates to a process for improving the dye-receptivity of polypropylene. More particularly, it relates to a method of initially treating polypropylene with a suitable organic solvent whereby the polypropylene is rendered much more receptive to a subsequent dyeing step.

Heretofore, it has been difficult if not impossible to satisfactorily dye articles made from polypropylene. The difficulty appears to be due to the particular structure of polypropylene in that it contains only carbon and hydrogen atoms. Thus, polypropylene is free of polar or reactive atoms or radicals and accordingly its structure is not very suitable or satisfactory for forming bonds of a physico-chemical nature with the various dyes described in the literature.

Polypropylene consisting predominantly (more than 50%) of isotactic macro-molecules, obtained by suitable stereospecific polymerization processes such as those disclosed by Natta et al., is of particular interest.

In addition, attempts to use the so-called "plastosoluble" dyes to dye polypropylene have also proven unsatisfactory. Such plastosoluble dyes can be "dissolved" in materials containing no reactive groups such as polypropylene materials. Good results were not obtained, however, for the dye-polypropylene solutions obtained exhibited little or no fastness.

Accordingly, it is an object of our invention to provide a method for improving the dye-receptivity of polypropylene.

Another object is to provide a method of dyeing polypropylene wherein the dyed polypropylene exhibits unusual color fastness.

Additional objects will become apparent hereinafter.

In accordance with one aspect of our invention, we have found that very intense shades can be obtained, provided that the polypropylene polymer is initially subjected (before dyeing) to treatment with an organic solvent. This solvent may be a hydrocarbon, i.e., an aliphatic, aromatic, hydro-aromatic, or a heterocyclic compound and may or may not be substituted with such substituents as e.g., alkyl, amino, chloro, bromo, etc. The solvent should be comparatively low boiling, that is, have a boiling point below 150° C., and preferably have a boiling point between about 20° C. and 100° C.

This preliminary treatment of the polypropylene polymer, which is generally in staple fibre form by the method of our invention permits an increase in the depth of penetration of the subsequently applied dye into the polymer, so that more intense fast, and homogeneous shades are obtained.

The dyeing step may be carried out using any number of the known dyes and in accordance with conventional dyeing techniques.

The "plastosoluble" dyes, which generally contain one or more alkyl-, cycloalkyl-, or aryl-amino groups, or combinations thereof, are particularly suitable. With such dyes, very intense shades may be obtained using as the total amount of dye a quantity equivalent to 1% by weight of the material to be dyed, and the dyeing bath remains well exhausted.

The temperature for carrying out the initial treatment of the polypropylene with a solvent is dependent on the particular type of solvent used. In general, this temperature is from about room temperature up to the boiling point of the solvent.

The duration of the initial solvent treatment may vary within considerable limits, but generally is from about one minute to one hour.

The solvent/polymer ratio may vary within wide limits. These limits are comprised between the minimum ratio which still permits complete wetting of the polymer and a maximum limited only by economical considerations. A solvent/polymer ratio of from about 10:1 to 30:1 is preferred.

The following solvents are particularly suitable: gasoline, ligroin, hexane, benzene, toluene, chlorobenzene, cyclohexane, cyclohexylamine, bromoethylene, dioxene, etc.

At the end of the solvent treatment the solvent is removed either partially or completely. The drying may be carried out at from room temperature up to about 70° C. At the latter temperatures the drying time should not exceed 4 hours, in order not to alter the fibre orientation. Squeezing or centrifuging are alternative means to partially remove the solvent. The polyproylene polymer, even after complete removal of the solvent therefrom, maintains its unusual dye receptivity for a long period, i.e., for at least a year.

While it is not essential when using normally insoluble dyes or dyes of limited solubility in the dyeing bath we prefer to carry out the dyeing process in the presence of a soaking or dispersing agent, whether of the ionogen type or not.

The following examples will further illustrate our invention. All parts are by weight unless otherwise indicated. In each example, a similar dyeing treatment of a staple that had not undergone preliminary treatment with a solvent produced less intense shades having poor fastness.

EXAMPLE 1

4 g. of polypropylene staple are heated with 100 ml. of cyclohexane at its boiling temperature for 20 minutes. The staple is then removed, dripped to partially remove the cylohexane solvent, and introduced into a dyeing bath containing 100 ml. of water, 0.1 g. of Marseilles soap and 0.04 g. of 1,4-di-(isobutylamino) anthraquinone. Dyeing is carried out at 95–100° C. for 1 hour. An intense and uniform blue shade is obtained. Dyeing of a second staple without the initial treatment with cyclohexane results in a shade that is much less intense.

EXAMPLE 2

4 g. of polypropylene staple are heated for 30 minutes with 80 ml. of benzene at its boiling point. After this treatment the staple is removed from the bath, squeezed, and placed in a dyeing bath consisting of 100 ml. of water, 0.1 g. of Marseilles soap, and 0.04 g. of 1-methyl-amino-4-(beta-methoxy)ethylaminoanthraquinone. The dyeing is carried out at 95–100° C. for half an hour. An intense blue shade is obtained. By replacing this dye with Blue Celliton FFG (Color Index 62050), a blue color with a greenish shade is obtained.

EXAMPLE 3

4 g. of polypropylene staple are heated for 1 minute with 60 ml. of cyclohexane at its boiling point. The staple is then dripped, squeezed, and placed in a dyeing bath consisting of 100 ml. of water, 0.1 g. of Marseilles soap, and 0.02 g. of 1,4-di-(n-octylamino)anthraquinone. The dyeing is carried out at 95–100° C. for half an hour. A brilliant blue shade is obtained.

EXAMPLE 4

4 g. of polypropylene staple are boiled with benzene for 30 minutes. The staple is then dripped, squeezed, and dried for 4 hours in an oven at 60° C. The dried staple is dyed in a boiling bath containing 100 ml. of water, 0.1 g. of Marseilles soap, and 0.04 g. of Green Crystals dye (Color Index 42040). An intense green shade is obtained.

EXAMPLE 5

4 g. of polypropylene staple are boiled with 120 ml. cyclohexane for 30 minutes. The staple is then dripped, squeezed, and dried in an oven at 60° C. for 4 hours. The dried staple is stored at room temperautre for 24 hours. The dyeing is then carried out as described in Example 4. An intense green shade is obtained.

The dye used in Example 4 may be replaced by any of the other dyes mentioned in the preceding examples to produce intense shades.

EXAMPLE 6

4 g. of polypropylene staple are heated to 90° C. with chlorobenzene for 90 minutes. The treated staple is dried for 24 hours in air at room temperature and then dyed with the dye of Example 1, to produce an intense uniform blue shade. Substitution of this dye with any of the dyes of Examples 2–4 produces corresponding intense shades.

The same excellent results are also obtained if the treated fibre is initially air dried for a longer period, e.g. 10 days.

EXAMPLE 7

4 g. of polypropylene staple are boiled with 80 ml. benzene for half an hour. The staple thus obtained is dried in air at room temperature. Dyeing is carried out after 60 days using the dye of Example 1, to thereby obtain an intense blue shade. Substitution of this dye with any of the dyes of Examples 2–4 produced corresponding intense shades.

EXAMPLE 8

4 g. of polypropylene staple are heated with 100 ml. of cyclohexylamine to 90° C. for 20 minutes. The staple is dripped, squeezed, and immersed into a dyeing bath containing 200 ml. of $H_2O$, 0.2 g. of soap, and 0.04 g. of 1-methyl-amino-4-isobutylamino-anthraquinone or 1,4-di(n-butylamino) anthraquinone. The dyeing is carried out at 90–100° C. for 1 hour. In either instance, an intense and homogeneous blue shade is obtained. The same results are obtained if the cyclohexylamine is first completely eliminated by washing with cold water.

EXAMPLE 9

2 g. of polyproylene staple are immersed into 50 ml. of benzene at room temperature. After 5 minutes the staple is withdrawn, dripped, and placed in a dyeing bath consisting of 100 ml. of $H_2O$, 0.1 g. of Marseilles soap, and 0.04 g. of 1,4-di(n-decylamino) anthraquinone.

The dyeing is carried out at 85–100° C. for 1 hour. A homogeneous blue shade is obtained.

EXAMPLE 10

4 g. of polypropylene staple are boiled with 80 ml. of benzene for half an hour. The thus obtained staple is dried in air at room temperature. The dyeing of the staple is carried out after a delay of one year by proceeding as described in Example 1. The obtained intense homogeneous blue shade is considerably more satisfactory than that obtainable by dyeing a staple not subjected to a preliminary solvent treatment.

EXAMPLE 11

4 g. of polypropylene staple are heated to 100° C. with 100 ml. of ethylene bromide for 15 minutes.

After this period the staple is withdrawn, dripped and placed in a dyeing bath consisting of 200 ml. of $H_2O$, 0.4 g. of soap and 0.04 g. of any of the dyes mentioned in the preceding examples.

The dyeing is carried out at 85–100° C. for one hour. A homogeneous and intense shade is obtained.

EXAMPLE 12

2 g. of polypropylene staple are boiled (59° C.) with hexane for 30 minutes. After this period the staple is withdrawn, dripped and placed in a dyeing bath consisting of 100 ml. of $H_2O$, 0.1 g. of Marseilles soap and 0.02 g. of any of the dyes mentioned in the preceding examples.

The dyeing is carried out at 85–100° C. for one hour. A homogeneous and intense shade is obtained.

EXAMPLE 13

4 g. of polyproylene staple are boiled for 10 minutes with 100 ml. gasoline (liquid having the characteristics as defined in Merk Index, U.S.A. ed., 1952, page 453).

After this period the staple is withdrawn, dripped and placed in a dyeing bath consisting of 200 ml. of $H_2O$, 0.2 g. of soap and 0.04 g. of 1,4-di-(isopropyl-amino) anthraquinone.

The dyeing is carried out at 85–100° C. for 1 hour. A homogeneous and intense shade is obtained.

EXAMPLE 14

4 g. of polypropylene are heated to 60–70° C. for 15 minutes with 100 ml. of toluene.

After this period the staple is withdrawn, dripped and placed in a dyeing bath consisting of 200 ml. of $H_2O$, 0.2 g. of soap and 0.04 g. of any of the dyes mentioned in the preceding examples.

The dyeing is carried out at 85–100° C. for 1 hour. A homogeneous and intense shade is obtained.

Additional dyeing examples are summarized below in Table I:

*Table 1*

| Example | Solvent | Dye | Treatment time of fiber before dyeing, Minutes | Dyeing carried out according to process described in Example No.— |
|---|---|---|---|---|
| 15 | Dioxane | 1,4-di-(isobutyl-amino) anthraquinone. | 10 | 1 |
| 16 | (a) Cyclohexane or | 1,5-di-(n-dodecyl-amino) anthraquinone. | 20 | 1 |
| 17 | (b) Benzene |  | 30 | 2 |
| 18 | (a) Cyclohexane or | 1-methylamino-4-(oleyl) amino-anthraquinone. | 20 | 1 |
| 19 | (b) Benzene |  | 30 | 2 |
| 20 | Ligroin | 1,4-di-(isobutyl-amino)-anthraquinone. | 20 | 1 |

Of course, variations can be made without departing from the spirit of our invention.

Having thus described our invention, what we desire to secure and claim by Letters Patent is:

1. A method for improving the dye-receptivity of polypropylene, which comprises, before the dyeing thereof, contacting said polypropylene, at a temperature between room temperature and the boiling point of the solvent, for a period of time of at least about one minute, with an amount of an organic solvent having a boiling point not greater than 100° C., sufficient to completely wet the polymer, at least partially removing said solvent from the polypropylene after said contacting step, and dyeing said polypropylene.

2. The method of claim 1, wherein said solvent is completely removed from said polymer after said contacting step.

3. The method of claim 1, wherein the boiling point of said solvent is between 20° and 100° C.

4. The method of claim 1, wherein the solvent/polymer ratio is from 10:1 to 30:1.

5. The method of claim 1, wherein after said solvent treatment said polypropylene is dyed with a plastosoluble dye.

6. The process of claim 5, wherein the dyeing is carried out in the presence of a dispersing agent.

7. The product of the process of claim 1.

8. The product of the process of claim 5.

References Cited by the Examiner

UNITED STATES PATENTS

| | | |
|---|---|---|
| 2,347,508 | 4/44 | Rugeley et al. |
| 2,394,688 | 2/46 | Heyman. |
| 2,394,689 | 2/46 | Heyman. |
| 2,489,537 | 11/49 | Neumann. |
| 2,812,230 | 2/57 | Evans. |
| 2,938,811 | 5/60 | Hermes. |

FOREIGN PATENTS

| | | |
|---|---|---|
| 445,345 | 3/36 | Great Britain. |
| 614,009 | 12/48 | Great Britain. |
| 682,175 | 11/52 | Great Britain. |
| 809,495 | 2/59 | Great Britain. |
| 814,582 | 6/59 | Great Britain. |

NORMAN G. TORCHIN, *Primary Examiner.*

MORRIS O. WOLK, ABRAHAM H. WINKELSTEIN,
*Examiners.*